March 6, 1951     H. W. PRICE     2,544,041

POWER STEERING MECHANISM

Filed Dec. 13, 1945     2 Sheets-Sheet 1

INVENTOR.
HAROLD W. PRICE.
BY
ATTORNEY.

March 6, 1951     H. W. PRICE     2,544,041
POWER STEERING MECHANISM

Filed Dec. 13, 1945     2 Sheets-Sheet 2

INVENTOR.
HAROLD W. PRICE.
BY
H. O. Clayton
ATTORNEY.

Patented Mar. 6, 1951

2,544,041

UNITED STATES PATENT OFFICE 2,544,041

POWER STEERING MECHANISM

Harold W. Price, Bradenton, Fla., assignor to Bendix Aviation Corporation, South Bend, Ind., a corporation of Delaware Application December 13, 1945, Serial No. 634,853

2 Claims. (Cl. 74—388)

This invention relates to a mechanism adaptable for use as a part of the steering mechanism of an automotive vehicle, said mechanism providing an easily controlled means for effecting the steering operation; and the principal object of my invention is to provide in such a mechanism a simple and compact power take-off mechanism driven by the internal combustion engine of the vehicle.

Yet another object of my invention is to provide, in the steering mechanism of an automotive vehicle, a power take-off mechanism operative to provide a follow-up control whereby power means of said mechanism is automatically cut out of operation, to arrest the turning movement of the steering wheels, when the driver arrests the turning movement of the steering wheel in the steering operation.

A further object of my invention is to provide an efficient and effective power take-off mechanism which may, if desired, be used as a part of the power steering mechanism of an automotive vehicle, said mechanism including a plurality of gears in constant mesh, the operation of said gears being in part controlled by a manually operated clutch mechanism.

Other objects and features of my invention will become apparent from the following description taken in connection with the drawings, in which.

Figure 1:
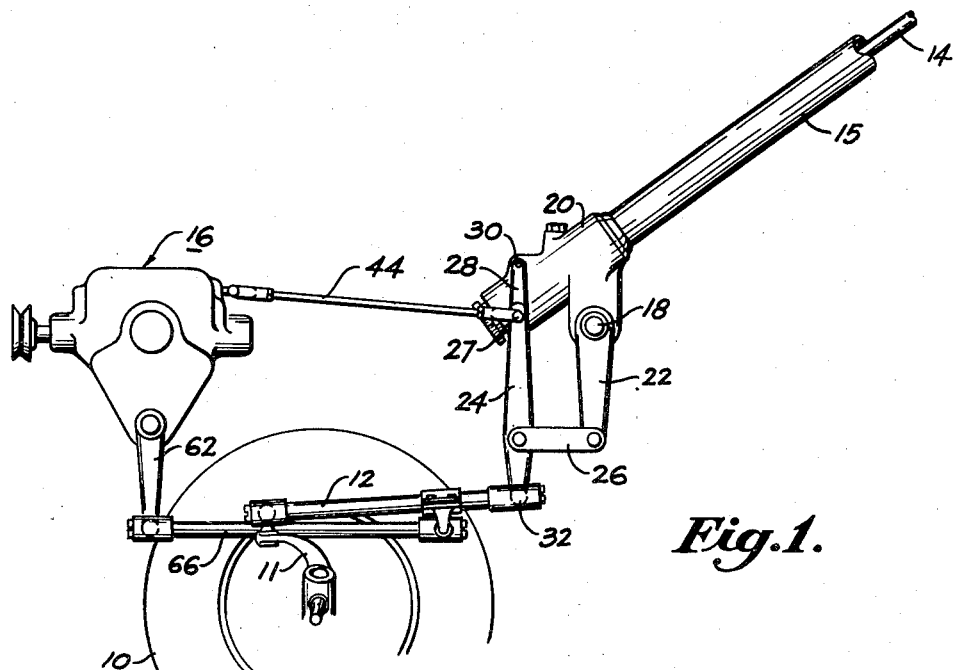
Figure 1 is a diagrammatic view disclosing the principal features of the steering mechanism of an automotive vehicle said mechanism including the power take-off mechanism constituting my invention.

Referring now to the four figures of the drawings which disclose a preferred embodiment of my invention, one of the two interconnected dirigible wheels of an automotive vehicle is indicated by the reference numeral 10 and said wheel is actuated by a steering arm 11 which is in turn actuated by a drag link 12.

My invention, that is the power take-off mechanism 16, of Figure 1, is employed as a part of the steering mechanism interconnecting a steering wheel operated shaft 14 and the drag link 12; and said mechanism is operative to actuate the dirigible wheels solely by the power means of the mechanism or by the combined effort of said power means and the physical effort of the driver; and this mechanism is also so constituted that the steering operation may be effected solely by the physical effort of the driver in the event of the failure of the power means of the mechanism.

Describing now a part of the force transmitting means interconnecting the power take-off mechanism, the drag link and the steering shaft, said means includes a shaft 18 which is rotated in one direction or the other by means of the usual gearing 20 mounted at the base of the steering post 15, said gearing being actuated by the shaft 14. A crank 22, drivably connected to the shaft 18, is connected to a floating lever 24 by means of a connecting link 26 and said lever is pivotally connected at its upper end to a pin 27 extending from the lower end of a supporting strap 28. The latter member is pivotally mounted upon a pin 30 extending from the casing of the gear mechanism 20; and the lower end of the floating lever 24 is pivotally connected at 32 to the drag link 12.

Figure 2:
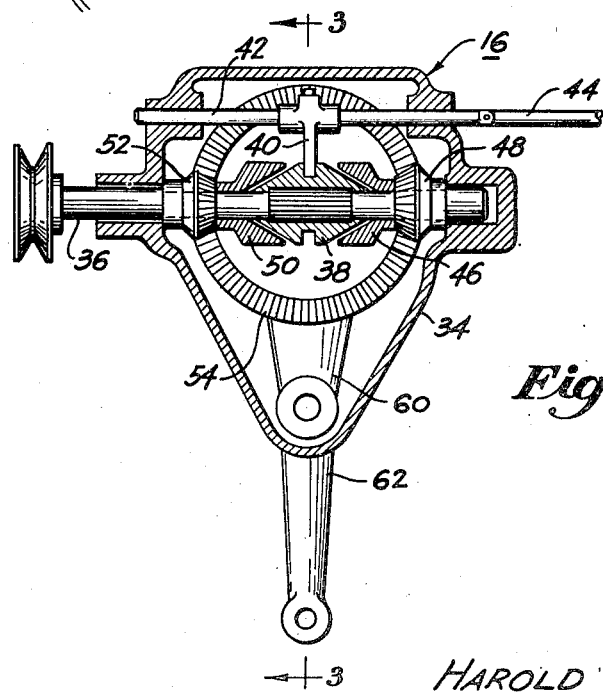
Figure 2 is a sectional view disclosing details of the power take-off mechanism of my invention.

Describing now the principal feature of my invention, that is the power take-off mechanism 16, this mechanism includes a two part casing 34, Figure 2, having journalled therein a shaft 36 driven by the internal combustion engine of the vehicle. A durable cone clutch member 38 is drivably connected to the latter shaft, said member being selectively moved to the right or to the left by means of a shifter fork member 40 which is secured to a rod 42 mounted at its ends within the casing 34; and said rod is connected, by a link 44, with the lever 24. When moved to the right, Figure 2, the clutch member 38 drivably contacts a clutch member 46 drivably connected with a beveled gear member 48; and when moved to the left the clutch member 38 drivably contacts a clutch member 50 drivably connected with a beveled gear member 52. The gear members 48 and 52 and the clutch members connected thereto are rotatably mounted on the drive shaft 36 and said gear members are in mesh with a ring gear 54. It follows therefore that the ring gear is rotated in one direction or the other depending upon the direction of movement of the driving clutch member 38.

Figure 3:
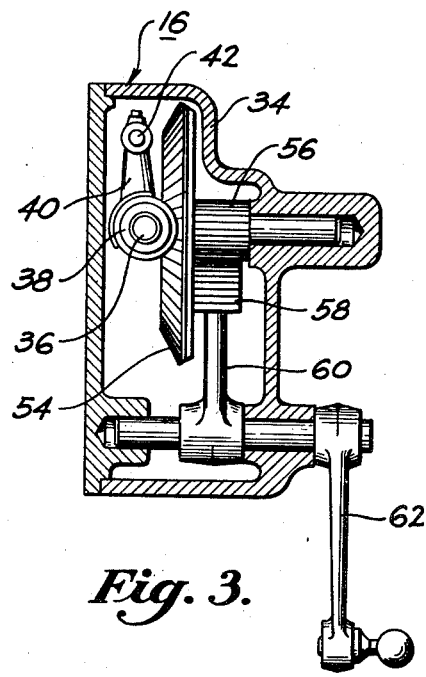
Figure 3 is a sectional view, taken on the line 3—3 of Figure 2, disclosing further details of the power take-off mechanism of my invention.
Figure 4:
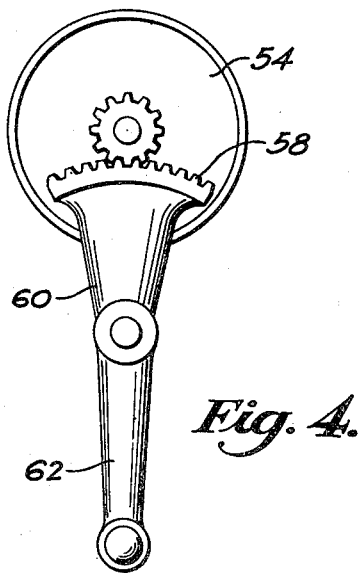
Figure 4 is a view disclosing the gear and sector for operating the pitman arm of the steering mechanism of Figure 1.

Completing the description of the power take-off mechanism of my invention, a gear member 56, Figure 3, is drivably connected with the ring gear 54 and said member is meshed with a gear sector member 58 which is operably connected, by a crank 60, with a pitman arm 62; and the latter member is pivotally connected with the drag link 12 by means of a link 66.

Describing now the operation of the mechanism of my invention when the driver wishes to steer the vehicle to the right, he of course rotates the steering wheel, not shown, in a clockwise direction; and this operation serves to rotate the floating lever 24 clockwise about its pivotal connection 32 with the drag link 12. Explaining this operation of the lever 24 the force necessary to move the link 44 is, at this time, less than the force necessary to move the drag link. Now when the lever 24 is rotated clockwise this operation serves to drivably interconnect the clutch members 38 and 46 whereupon the ring gear 54 is rotated to effect a counterclockwise rotation of the pitman arm 62 direction of the rotation of the drive shaft 36 being such as to effect this operation; and this operation serves to place the link 66 in compression to effect a right turn operation of the drag link 12.

If the driver arrests the movement of the steering wheel just after he has completed the above described operation of the clutch mechanism 38, 46 then the resulting operation of the drag link effects a counterclockwise rotation of the lever 24 about its pivotal connection with the link 26; and this operation serves to disconnect the clutch members 38 and 46 thereby automatically cutting the power take-off mechanism 16 out of operation. In other words there is provided, by the above described mechanism, a follow-up control of the power take-off mechanism 16 whereby the driver may, by successive turning operations of the steering wheel, effect, a step by step right turn steering operation of the front wheels of the vehicle.

Now it is to be noted that the parts of the above described mechanism are so constructed and arranged and so operative that the driver may, by effecting a continuous turning movement of the steering wheel and by exerting a force upon said wheel greater than that necessary to maintain an engagement of the clutch mechanism, effect a combined power and manual operation of the steering mechanism; and it is also to be noted that should the power take-off mechanism fail in operation, then the steering operation can be effected solely by the physical effort of the driver. Explaining the latter operation if the clutch member 38 is brought into contact with either the clutch member 46 or the clutch member 50 then it is impossible to effect any further movement of the rod 44; and when this occurs, then the pin 27 becomes a fixed fulcrum for the lever 24 and the rotation of said lever effects a manual operation of the steering mechanism.

The above described operation of the mechanism effects a right turn steering operation of the front wheels of the vehicle and it follows from said description that a left turn operation of said wheels will result when the steering wheel is rotated in a counterclockwise direction.

There is thus provided by the power take-off mechanism of my invention a simple and compact mechanism which is well adapted to be used in the steering mechanism of an automotive vehicle; however, it is obvious that my invention may, without modification, be used to operate other mechanisms; for example, the arm 11 of Figure 1 might serve to operate a closure member.

I claim:

1. A power take-off mechanism adapted to be incorporated in the steering mechanism of an automotive vehicle said mechanism including a casing member, a drive shaft journalled in said casing, a ring gear within said casing, a pitman arm, force transmitting means including a gear member drivably connected with the ring gear and a sector meshing with said gear member and connected to the pitman arm, said force transmitting means interconnecting the pitman arm and ring gear, a plurality of bevel gears in mesh with the ring gear, and means mounted on the drive shaft for selectively driving one or the other of said bevel gears.

2. A power take-off mechanism adapted to be incorporated in the steering mechanism of an automotive vehicle said mechanism including a casing member, a drive shaft journalled in said casing, a ring gear within said casing, a pitman arm, a drag link connected to the pitman arm, force transmitting means, including a gear drivably connected with the ring gear and a sector connected with the pitman arm, interconnecting the pitman arm and ring gear, a plurality of bevel gears in mesh with the ring gear, clutch means mounted on the drive shaft and operable to selectively drive one or the other of said bevel gears, and manually operated control means connected to both the drag link and the clutch means.

HAROLD W. PRICE.

REFERENCES CITED

The following references are of record in the file of this patent:

UNITED STATES PATENTS

| Number | Name | Date |
| --- | --- | --- |
| 502,230 | Kramer | July 25, 1893 |
| 1,192,195 | Hendrickson | July 25, 1916 |
| 1,744,959 | Fuhr | Jan. 28, 1930 |
| 1,760,345 | Congdon | May 27, 1930 |
| 1,763,470 | Lemon | June 10, 1930 |
| 1,787,319 | McDonald | Dec. 30, 1930 |
| 1,939,453 | Lang | Dec. 12, 1933 |
| 2,171,715 | Sinclair | Sept. 5, 1939 |
| 2,429,185 | Hukill | Oct. 14, 1947 |